Patented Feb. 7, 1950

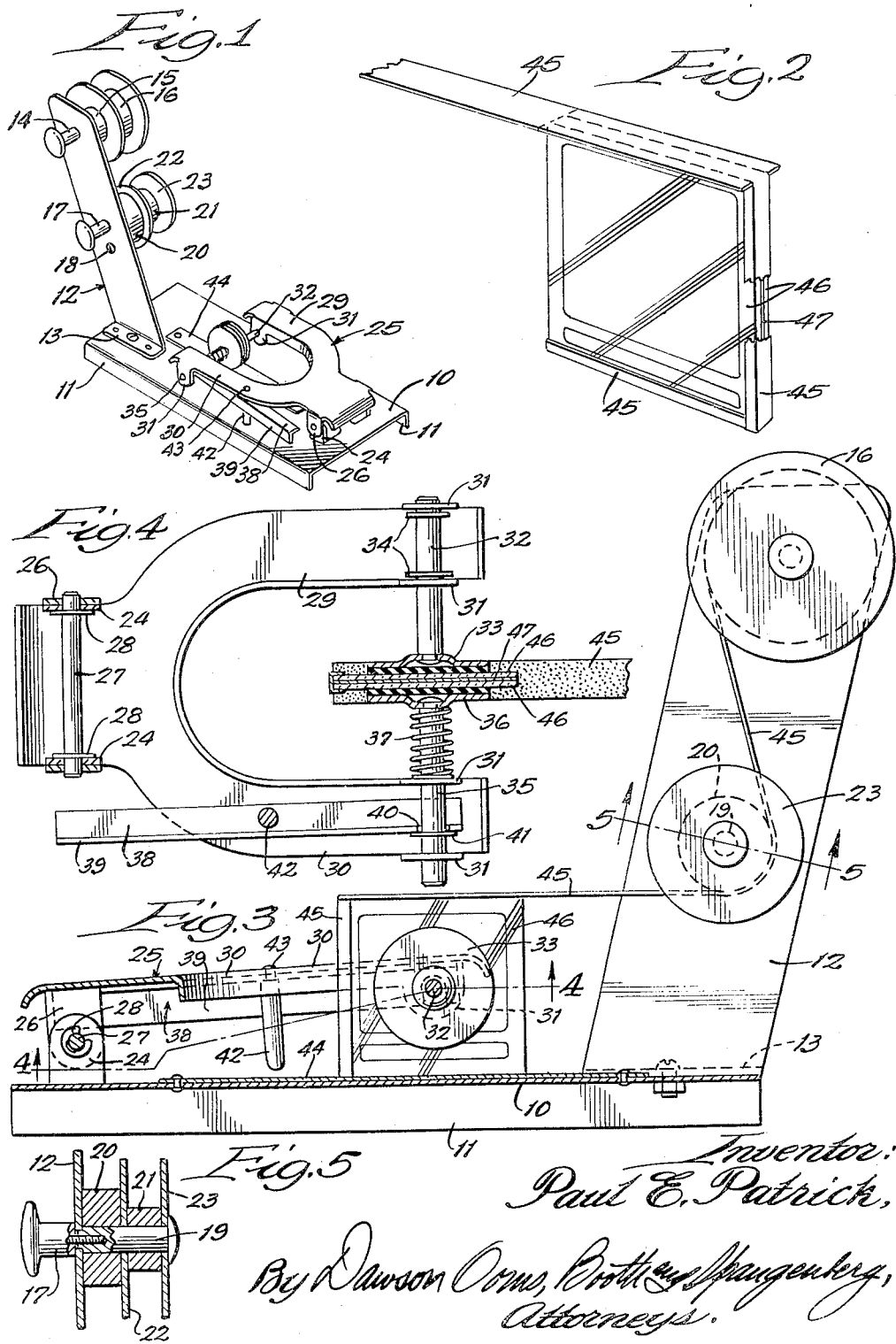

2,496,406

UNITED STATES PATENT OFFICE 2,496,406

SLIDE BINDER APPARATUS

Paul E. Patrick, Arlington Heights, Ill., assignor to Compco Corporation, Chicago, Ill., a corporation of Illinois Application August 7, 1948, Serial No. 43,020

9 Claims. (Cl. 154—1.6)

This invention relates to slide binder apparatus, and is particularly useful in the binding of glass slides about photograph film transparencies. The invention is especially directed toward the feeding of binding tape against glass slides to form a tape border therefor so that the transparencies are thus permanently protected by the plates and the tape binding.

An object of the present invention is to provide a structure in which clamping mechanism supports the glass slides with the transparency therebetween in such a manner that the flat bottom of the slides rests squarely upon the platform of the apparatus, thus maintaining the slides in a rigid non-rotating position when the tape is applied thereto. Another object is to provide in such a structure, lever means for readily separating the clamping disks to permit the insertion or removal of the slides, while at the same time supporting the clamping structure upon a tiltable frame and thus making the frame applicable for handling slides of different sizes. Yet another object is to provide a simplified structure for the holding of glass slides about transparencies while providing for the ready application of tape to the upper edge of the slides held against rotation, a tiltable support being provided which permits rotation of the slides when the support is lifted. Other specific objects and advantages will appear as the specification proceeds.

The invention is illustrated, in a single embodiment, by the accompanying drawing, in which—

Figure 1 is a perspective view of apparatus embodying my invention; Fig. 2, a broken perspective view of the glass slide and transparency combination with tape partially applied thereto; Fig. 3, a longitudinal sectional view; Fig. 4, a bottom plan section, the section being taken as indicated at line 4—4 of Fig. 3; and Fig. 5, a detail sectional view, the section being taken as indicated at line 5—5 of Fig. 3.

In the illustration given, 10 designates a platform provided with downwardly-turned flanges 11. To the forward end of the platform is secured a support arm 12 having a laterally-turned flange 13 bolted to the platform 10.

The arm 12 is provided at its top with an opening through which extends a retaining screw member 14 which is secured to a threaded bolt upon which is supported the tape pulleys 15 and 16. The pulleys 15 and 16 have cores of different sizes for receiving tape rolls of different sizes.

The arm 12 at a lower point is provided with an upper opening receiving the screw-equipped knob 17 which is similar to 14. It is also provided with an opening 18 therebelow for lowering the structure 17 when a smaller sized slide is being bound. A bolt 19, similar to the one employed with the pulley structures 15 and 16, is here employed to support an inner roller 20 and an outer roller 21. Flanges 22 and 23 are provided as guides for the tape. The rollers 20 and 21 serve to direct the tape from the rolls supported above in a forward direction, and preferably in the same horizontal plane in which the top edge of the glass slides lies, as shown more clearly in Fig. 3.

It has heretofore been the practice to support the glass slides, with the transparencies therebetween, at an elevation and to draw the tape about this structure. Under the necessary pressure for applying the tape, the slides tend to return and an even application of the tape is extremely difficult, requiring the use of both hands. I have discovered that by providing a tiltable support equipped with clamps, the glass slides can be allowed to rest with the flat bottom wall squarely against the platform so that turning movement is thus prevened and the slides are held firmly for the application of the tape which may be done readily with one hand. At the same time, the slides can be readily turned for binding the next side wall by simply tilting the supporting structure.

In the specific illustration given, I provide the supporting flanges 24 at the rear side of the platform 10 and mount upon them the tiltable clamp support 25. As shown more clearly in Figs. 1 and 4, the flanges 24 are struck upwardly from the metal platform 10, and the depending flanges 26 on each side of the clamp support 25 are pivotally supported upon the flanges 24 by the pin 27. Locking rings 28 engage recesses in the pin 27 and secure the pin rotatably in the position shown best in Fig. 4.

The clamp 25 is provided at its forward portion with the spaced arms 29 and 30. Each of the arms is provided with a pair of depending ears 31. Upon arm 29 is mounted a stationary pin 32, having fixed to the end thereof a clamping disk 33. As shown more clearly in Fig. 4, the pin 32 extends through the spaced ears 31 and is locked therein by means of the spring washers 34 which are received within annular recesses in the pin 32.

In contrast with arm 29, the arm 30 is provided with a slidably-mounted pin 35. The pin extends through aligned openings in the spaced ears 31, and the inner end of the pin is fixed to a clamping disk 36. A compression spring 37 extends between the ear 31 and the disk 36 and normally urges the disk 36 inwardly toward the fixed disk 33.

A lever 38 is provided with a depending flange 39 having a slot 40 therein receiving the pin 35. A washer 41 is received within an annular recess in pin 35 and lies against the vertical flange 39 of the lever 38, as shown best in the bottom plan sectional view in Fig. 4.

A stop and pivot pin 42 is secured to the clamp support 25 by riveting at 43 and extends through the lever 38 to provide a pivot therefor. The pin 42 also serves as a stop to limit the downward movement of the clamp support 25 at a spaced distance above the platform 10.

To protect the platform 10, I provide the platform with a wear plate 44 which is riveted to the platform 10, as shown best in Fig. 3. The wear strip 44 is preferably a hardened and polished strip of metal upon which the bottom edges of the glass slides rest when tape is being secured to the top edges thereof.

In the illustration given in Figs. 3 and 4, a tape strip 45 is guided about one of the rollers therebelow and brought forwardly over the glass slides 46 which have a transparency 47 therebetween, as shown best in Fig. 4.

*Operation*

In the operation of the device, the slide glasses, after being cleaned, are placed about the transparency and the operator presses the rear end of lever 38 to move the clamping disk 36 away from the fixed disk 33. The assembled slide glasses and transparency are then placed between the clamping disks, preferably with the disk faces at approximately the centers of the glasses and with the flat bottom edges of the disks resting against the wear plate 44, as shown more clearly in Fig. 3. The binding tape 45, whose non-adhesive side bears against the guide roller, is drawn forwardly, as shown in Fig. 3, and applied to the top edge of the assembled slide glasses. Since the glasses are held rigidly, the operator can press the tape firmly against the glass edges with one hand. After this operation, the pivot clamp support 25 may be raised slightly to allow the slides to be swung to a second position so as to bring the next flat edge against the wear plate 44. Tape is then applied in the same manner to the newly-exposed edges. The pins 32 and 35 readily permit rotation of the slides as the slide is turned to bring the tape successively about the edges of the plates. While the operation has been described in detail as to the above steps, in actual practice the operator accomplishes these movements with great speed while at the same time firmly binding the tape against the edges of the slides as they are held by reason of the contact of the bottom edge while against wear plate 44.

The tape is preferably slitted at each corner and the edges are lapped over to form a smooth flat corner which will not stick in the slide carrier of the projector. By pressing the lever 38 inwardly, the slide is removed from the clamping disks and the tape may then be pressed downwardly firmly along the sides, and the slide is now ready for use. Thus, most of the movements required can be brought about with one hand, leaving the other hand free for drawing the tape, etc. The lever may be pressed laterally with the thumb, while the forefinger presses the tape upon the slide edges, and the same hand may be used for lifting the pivot support 25 when the slide is to be rotated to bring another edge into engagement with the tape. It will be understood that the procedure which has been suggested above is merely one of several procedures which may be used with the apparatus for quickly and effectively securing the binding tape about the slide glasses.

The clamping disks 33 and 36 are preferably equipped on their inner side with a resilient facing. The clamping disks hold the glass squarely on all or any of its four sides.

While in the foregoing specification, I have set forth the structure in considerable detail for the purpose of illustrating one embodiment thereof, it will be understood that such details of structure may be varied widely by those skilled in the art without departing from the spirit of my invention.

I claim:

1. In slide binder apparatus, a platform, a clamp support tiltably mounted upon the platform, spring-urged separable clamps mounted upon said support and adapted to support slide glasses with the bottom edges thereof resting upon said platform, means for guiding tape to the top edge of said slide glasses while the same rest upon said platform, and means for separating said clamps.

2. In slide binder apparatus, a platform adapted to receive slide glasses with the flat edges thereof on one side abutting the platform, a pivotally-mounted clamp support carried by said platform, separable clamps carried by said support, spring means urging said clamps together, means for separating said clamps, and means for guiding tape forwardly against the top edge of the slide.

3. In slide binder apparatus, a platform, a tiltable clamp support mounted upon said platform, spring-urged separable clamps carried by said support and adapted to support slide glasses with their lower edges resting upon said platform, and a lever pivotally mounted upon said support for separating said clamps.

4. In slide binder apparatus, a platform having upwardly-struck supports, a clamp support pivotally mounted upon said platform supports and having bifurcated arms extending forwardly therefrom, a fixed pin secured in one of said arms, a clamping disk fixed to the end of said pin, a slidably-mounted pin carried by the other of said arms, a clamping disk fixed to the inner end of said slidably-mounted pin, a spring about said slidable pin and urging the disk thereof toward the stationary disk, a lever pivoted to said support and engaging said pin for moving the same laterally to separate said disks.

5. In slide binder apparatus, a platform, a clamp support pivotally mounted on said platform and having bifurcated arms extending forwardly therefrom, a pin fixed to one of said arms and equipped at its inner end with a clamping disk, a second pin slidably mounted in the other arm and equipped with a disk at its inner end, a spring normally urging the latter disk toward the stationary disk, an actuating lever having one end engaging said slidable pin to move the same for separting said disks, and a pivot pin secured to said support and extending through said lever to provide a pivot therefor, said pivot pin extending beyond said lever and providing a stop to limit the downward movement of said support.

6. In slide binder apparatus, a platform, a clamp support pivotally mounted on said platform and having bifurcated arms extending forwardly therefrom, a pin fixed to one of said arms and equipped at its inner end with a clamping disk, a second pin slidably mounted in the other arm and equipped with a clamping disk at its inner end, a spring normally urging the latter disk toward the stationary disk, an actuating lever having one end engaging said slidable pin to move the same for separating said disks, and a pivot pin secured to said support and extending through said lever to provide a pivot therefor, said pivot pin extending beyond said lever and providing a stop to limit the downward movement of said support, said clamping disks being adapted to receive slide glasses therebetween and said pin terminating at a space distance above the platform to permit the bottom edges of the slide glasses to rest upon said platform.

7. In slide binder apparatus, a platform equipped with a wear plate, a pivotally-mounted clamp support carried by said platform, separable disks mounted upon said support for receiving glass slides therebetween in vertical alignment with said wear plate, said disks being separable and normally urged toward each other by a spring, and a lever pivotally mounted upon said support and connected to one of said disks to separate the same for the removal and insertion of glass slides.

8. In slide binder apparatus, a platform equipped with a wear plate, a pivotally-mounted clamp support carried by said platform, separable disks mounted upon said support for receiving glass slides therebetween in vertical alignment with said wear plate, said disks being separable and normally urged toward each other by a spring, and a lever pivotally mounted upon said support and connected to one of said disks to separate the same for the removal and insertion of glass slides, said pivotally-mounted support allowing said slides to swing downwardly to bring their lower edges into engagement with said platform.

9. In slide binder apparatus, a platform, a clamp support pivotally mounted upon said platform and having bifurcated arms, each of said arms having depending ears, a pin fixedly mounted in the ears of one of said arms, a pin slidably mounted in the ears of the other arm, disks carried by the inner ends of said pins, a spring normally urging said slidable pin toward the stationary pin, and an actuating lever pivotally mounted upon the arm supporting said slidable pin and having its forward end engaging said slidable pin to move said pin against the force of said spring for the separation of said disks.

PAUL E. PATRICK.

REFERENCES CITED

The following references are of record in the file of this patent:

UNITED STATES PATENTS

| Number | Name | Date |
|---|---|---|
| 1,929,137 | Cassegrain | Oct. 3, 1933 |
| 2,164,655 | Kleerup | July 4, 1939 |
| 2,289,843 | Koch et al. | July 14, 1942 |
| 2,427,240 | Vachon | Sept. 9, 1947 |